Sept. 17, 1935.  J. EHRLICH ET AL  2,014,928
TOROIDAL RACE AND ROLLER TRANSMISSION MECHANISM
Filed May 31, 1934  4 Sheets-Sheet 1

Fig. 1

Inventors
Jacob Ehrlich &
John O. Almen
By Blackmore, Spencer & Hunt
Attorneys

Sept. 17, 1935.   J. EHRLICH ET AL   2,014,928
TOROIDAL RACE AND ROLLER TRANSMISSION MECHANISM
Filed May 31, 1934   4 Sheets-Sheet 2

Inventors
Jacob Ehrlich &
John O. Almen
By Blackmore, Spencer & Flint
Attorneys

Inventors
Jacob Ehrlich &
John O. Almen
By [signatures]
Attorneys

Sept. 17, 1935.   J. EHRLICH ET AL   2,014,928
TOROIDAL RACE AND ROLLER TRANSMISSION MECHANISM
Filed May 31, 1934   4 Sheets-Sheet 4

Inventors
Jacob Ehrlich &
John O. Almen
By Blackmore, Spencer & Flint
Attorneys

Patented Sept. 17, 1935

2,014,928

UNITED STATES PATENT OFFICE 2,014,928

TOROIDAL RACE AND ROLLER TRANSMISSION MECHANISM

Jacob Ehrlich, Detroit, and John O. Almen, Royal Oak, Mich., assignors to General Motors Corporation, Detroit, Mich., a corporation of Delaware Application May 31, 1934, Serial No. 728,266

19 Claims. (Cl. 74—200)

This invention pertains to variable speed friction transmission mechanisms, comprising coaxial races having opposed toroidal raceways and interposed rollers engaging said raceways; it is particularly intended for use in motor vehicles to transmit the power of the engine to the vehicle driving wheels at the most favorable ratios of engine to vehicle speed.

Objects of the invention are to improve the means for mounting and controlling the rollers, to simplify the roller carriers, reduce costs of production, improve the controls, and otherwise contribute to the practicability of manufacture and excellence of performance of friction race and roller transmission mechanisms.

The invention consists in roller carriers pivoted as by a universal joint at one end only to the supporting frame structure, and trailing therefrom under the influence of the tangential forces applied to the rollers by the races during forward driving; in novel means for inclining the rollers in order to steer them into different paths of movement on the raceways; in means for adjusting certain control elements to bring the several rollers into precisely similar relations with the races, and thus compensate for inaccuracies of machining; in means for restoring the axes of the rollers into radial planes including the race axis and roller centers after they have been inclined to vary ratio of input to output speed, and in various combinations and elements, as set forth in the following description and illustrated in the accompanying drawings.

In the accompanying drawings, in which like parts are indicated by like reference characters throughout the several views.

The invention is illustrated in a duplex friction race and roller transmission mechanism designed to be disposed behind the rear axle of a motor vehicle and operated from an engine mounted in front of said axle through a power input shaft geared to the driving races and offset from the power output shaft which latter drives a rear axle gearing from the rear.

Figure 1:
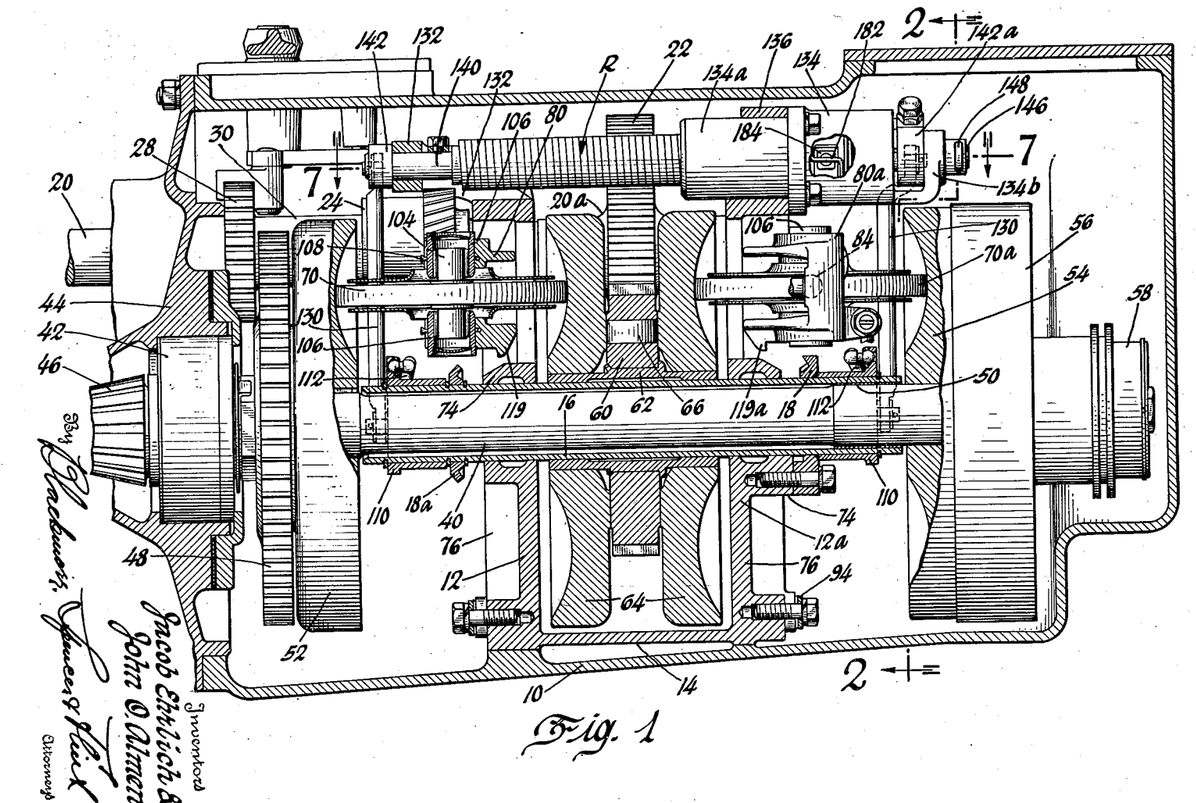
Fig. 1 is a section through the casing of a motor vehicle transmission mechanism embodying this invention and exposing the mechanism within partially in vertical longitudinal section.
Figures 4, 5, 6:
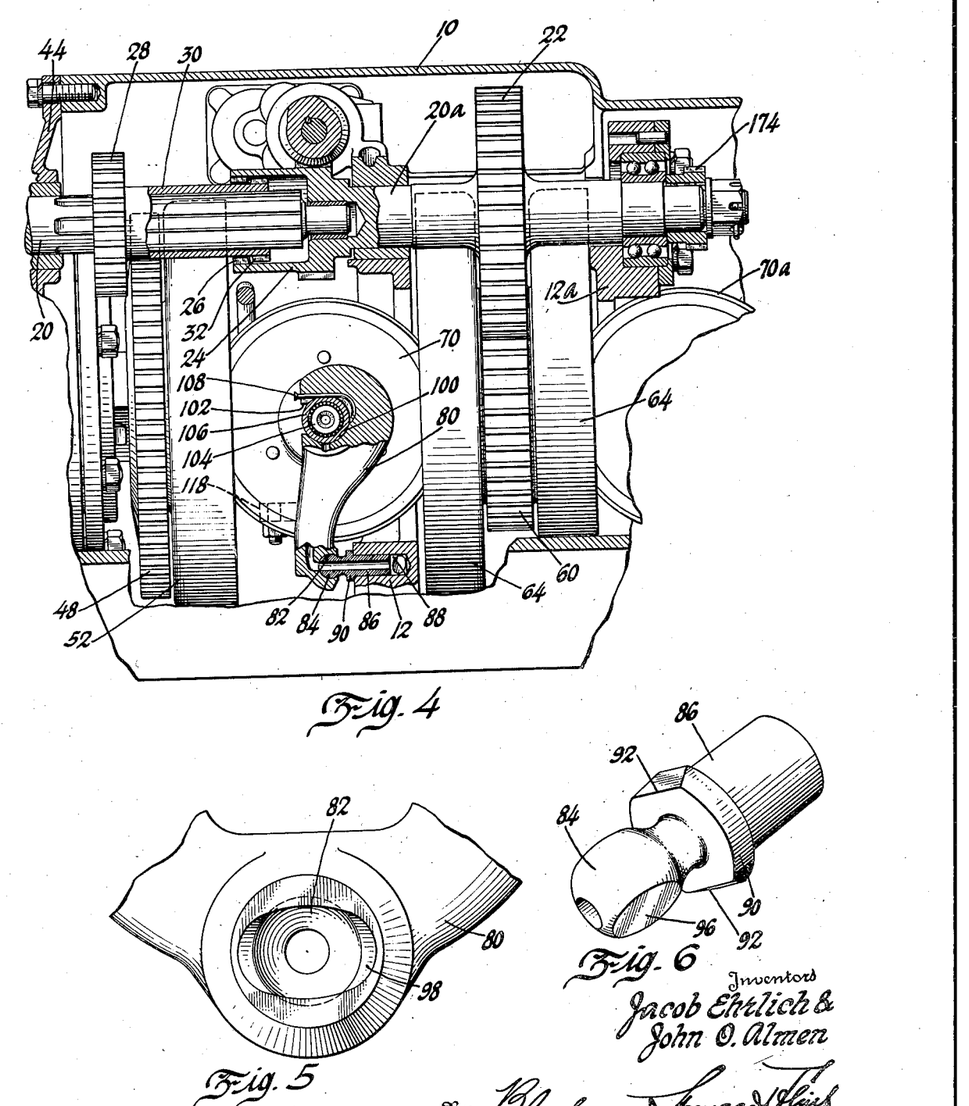
Fig. 4 is a section through the transmission casing in a plane indicated by line 4—4, Fig 2. disclosing interior mechanism, partly in section, as viewed from above it.
Figs. 5 and 6 are detail views illustrating one of the universal couplings by which the several carriers are moored to the supporting frame-work of the mechanism.

In the drawings, referring particularly to Figs. 1 and 4, 10 indicates a transmission casing for housing a duplex friction power transmission mechanism including two sets of races with opposed tortoidal raceways and interposed rollers for transmitting rotation from one race of each set to the other race thereof.

Fixed within casing 10 is an inner supporting and strengthening frame comprising separated, parallel transverse member 12, 12a rigidly united by a partially cylindrical web 14 and a tube 16. The inner supporting and strengthening structure 12, 12a and 14, may be a casting pinned or otherwise secured to the casing. Members 12 and 12a have alined central holes in which frame tube 16 is snugly fitted. Tube 16 is secured rigidly to member 12a by a collar 18 fixed to the tube, preferably by a weld, and bolted to the member 12a as shown in Fig. 1. Members 12 and 12a have each a plurality of openings arranged around the center for admitting the interposed transmission rollers referred to. Collar 18 functions as a stop for the rollers of one half of the transmission and a corresponding collar 18a as a stop for the rollers of the other half as will be later explained.

Input shaft 20 designed to transmit the power of an engine, not shown, to the transmission mechanism enters the front end of casing 10. The rear end of shaft 20 is reduced and piloted in the front end of a continuation input shaft section 20a, rotatable in bearings in supporting members 12, 12a, and carrying fixed thereto between the bearings a driving gear 22. Fixed to shaft section 20a is a hollow cylindrical member 24 extending over the rear end of shaft 20 and provided with internal clutch teeth 26. Splined on shaft 20 is a slidable reverse driving gear 28 having an integral hub-like sleeve 30 equipped with clutch teeth 32 at its end for engaging internal clutch teeth 26.

The output shaft is indicated by numeral 40. The front end of shaft 40 is supported in a bearing 42 seated in front wall 44 of casing 10. Forward of bearing 42 shaft 40 carries a bevel pinion 46 designed to mesh with the ring gear of a rear axle differential (not shown). Rearward of bearing 42 a reverse gear 48, adapted to mesh with slidable gear 28 is fixed to shaft 40. Shaft 40 extends rearward through tube 16 and has bearing at 50 in the rearward end of the tube. The shaft is reduced in diameter between bearing 50 and the other or forward end of the tube so that an annular space separates shaft and tube, thus relieving shaft 40 of strains due to rotation of the driving races supported on the tube as will presently appear.

Power is transmitted from power input shaft 20 through gear 22 to power output shaft 40, in parallel through the two halves of the duplex transmission mechanism shown by means now to be described.

Front and rear races 52 and 54, having toroidal raceways are drivingly connected to shaft 40 beyond the ends of tube 16.

Gear 22 on input shaft section 20a meshes with a gear 60 secured to a tubular hub-like member 62 rotatable freely on central tube 16. Member 62 projects axially fore and aft of gear 60, the projecting portions constituting bearings on which driving races 64 are mounted. Races 64 are preferably rotated by and with gear 60 through balanced or differential devices such as rollers rotatable about radial axes in slots through said gear, one of said devices being indicated at 66, Fig. 1. The races and gear may, however, be maintained in power transmitting engagement by any suitable means.

Power transmitting rollers are disposed between the driving and driven races, preferably a set of three rollers 70 between one driving race 64 and driven race 52 and a set of three rollers 70a between the other driving race 64 and driven race 54. The rollers are supported by carriers which cannot revolve about the axis of the output shaft but are so mounted on the frame work of the transmission as to allow the rollers to incline and tilt for changing ratio positions.

Race 54 and output shaft 40 are so connected as to permit relative axial movement. The hub-like member 62 on which driving races 64 are mounted may move axially, and the carriers of rollers 70 (to be hereinafter described) are mounted in such manner that the centers of rollers 70 may move slightly in an axial direction. Thus the races and rollers may be squeezed axially as it were, to produce the degree of tractive pressure between races and rollers necessary for transmitting the torque required. The required pressure is intended to be produced by spring and torque loading devices of any suitable construction, not shown in the drawings, as they are disposed within the flange 56 and cover 58, which rotate with race 54, and constitute no part of this invention.

Means for supporting and positioning rollers 70, 70a, which constitute the substance of this invention, will now be described.

Each of the transverse supporting and stiffening members 12, 12a, as previously stated, has openings through it, indicated at 72 (Fig. 2), to allow the rollers 70 and 70a to extend through the members 12, 12a, into peripheral contact with the races, and to allow said rollers to incline so that their axes of rotation become displaced out of the radial planes including the race axis and roller centers in which they rest normally,—i. e. so that the roller axes no longer intersect, if extended, the race axis but pass to one side thereof; and to tilt in order that their axes of rotation may be either perpendicular to the axis of the races in said radial plane or at various selected oblique angles thereto for the purpose of varying the transmission ratio. Members 12 and 12a for convenience may be designated "spiders" since each possesses a central hub-like portion 74, perforated to receive tube 16, and radiating spoke-like parts 76 connecting the hub-like part 74 to the rim which is seated in the casing 10.

Each roller 70 or 70a is rotatably mounted in a bifurcated or U-shaped carrier 80, or 80a, which is moored or anchored by a universal joint at its base,—where the two limbs join each other,—to the adjacent face of the rim part of spider 12 or 12a (see Fig. 4). As shown, the planes of rotation of the rollers include the center of the mooring joint.

Figure 2:
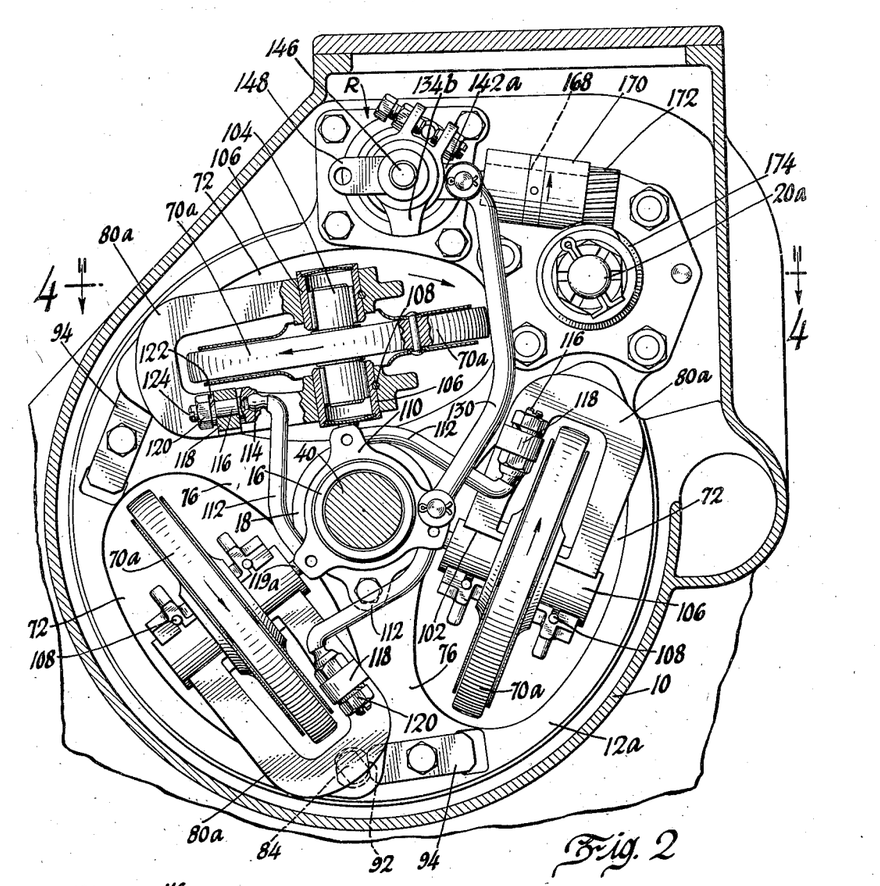
Fig. 2 is a transverse section on plane indicated by line 2—2, Fig. 1.

A description of one carrier 80 and its pivotal connection as illustrated in Fig. 4, will suffice for all. An undercut spherical cavity 82 in the back of the base of a carrier 80 receives the spheroidal head 84 of a mooring pin 86 the shank of which is seated in a hole 88 in that face of the rim part of spider 12, which confronts the adjacent driven race. Pin 86 is provided with a shoulder 90 which limits the depth the pin penetrates hole 88. Shoulder 90 has one or more flat sides 92 (Figs. 2 and 6) adapted to contact with a corresponding surface or surfaces on a detachable lock plate 94. In order that the spheroidal head 84 may be inserted in the hole 82, opposite sides of the head are flattened as at 96, (Fig. 6) and the entrance orifice of spherical cavity 82 is widened in one plane as at 98 (Fig. 5) to the extent of the long diameter of the head 84, so that the latter may be inserted and then rotated 90° into a position whence it cannot be pulled out. The pin may then be locked by adjusting and securing lock plate 94 in locking contact with a flat surface 92; as illustrated in Fig. 2.

The parallel limbs of bifurcated carriers 80, 80a, have at their free, spaced apart ends alined bearing seats for the roller axles. Fig. 4 illustrates the construction in connection with a carrier 80 which is representative of all the others. The limbs are shown with alined parti-cylindrical bearing openings 100 in their free ends. Lateral gaps 102 through the limbs, of less extent than the diameter of the bearing opening 100, permit the insertion laterally of the trunnions or axles 104 fixed in rollers 70, said trunnions having a diameter not greater than the width of gaps 102. Thereafter, capped bearing bushings 106 of an external diameter to fit nicely within the bearing openings 100, may be inserted from the outer sides over the ends of the axles 104 and locked in place by keys 108. Inner ends of two alined bushings 106 are spaced far enough apart to allow limited axial movement relative to the carrier, of axles 104 and attached rollers 70.

In the illustrated embodiment the two limbs of each bifurcated carrier rest in position to include a plane normal to the axis of the races when the rollers are in 1:1 ratio with the lateral gaps of the bearing openings facing the output race engaged by the roller mounted in said carrier. The surface of the carrier facing the adjacent output race is herein referred to as the carrier face. The socket 82 is formed in that side of any carrier that confronts the adjacent driving race and this side of a carrier is herein referred to as the back. Each carrier may swing on the ball-headed mooring pin in any direction. The tangential driving force of a race 64 on a roller 70 or 70a and the tangential reaction force between a roller 70 or 70a and a driven race 52, or 54 in forward driving, are exerted in a direction from the anchoring pin through the roller center so as to cause carrier 80 to "trail", as will be apparent on inspection, keeping in mind that input shaft rotates counter clockwise, as viewed in Fig. 2, and driving races 64 therefore clockwise as so viewed.

In order to change and control the ratio position of rollers 70 70a control means are illustrated which will now be described insofar as is deemed necessary to complete understanding of this invention.

Figure 3:
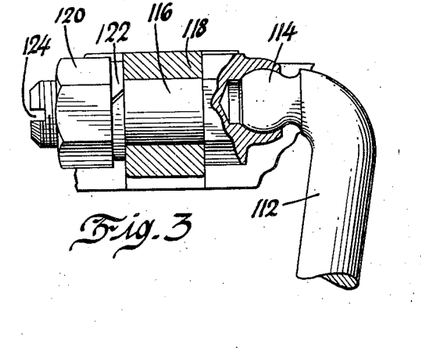
Fig. 3 is a detail of a connection between one of the roller carriers and a control element.

Sleeved over the ends of tube 16 are angularly movable, flanged, three armed collars 110. To each arm of each collar is pivoted one end of a link 112 the other end of which is turned at approximately a right angle terminating in a ball 114 socketed in a headed pin 116 adjustably seated in a lug 118 projecting from the face of that arm of the bifurcated carrier 80 (or 80a) which lies nearest output shaft 40 (Figs. 1 and 2). The socket in the head of pin 116 is disposed eccentrically with respect to the axis of the pin as clearly illustrated in Figs. 2 and 3. This pin may be rotated to any desired extent, by means of a screw driver engaging slot 124, formed in the pin, and secured by the nut 120 and associated lock washer 122. Provision is thus made for adjusting the link connection between rollers 70 and collars 110 in order to bring the several rollers of a set into precisely similar positions with respect to their paths of travel on the races.

Each collar 110 is connected by a link 130 to a control mechanism designated as a whole by reference letter R. Control mechanism R is supported at its forward end in bracket arm 132 rigidly secured to forward spider 12, and at its rearward end by a two-piece casing 134, 134a, seated in a hole in projecting part 136 of rearward spider 12a.

The element of the control mechanism which transmits motion to collars 110 is a central shaft 140, the front end of which is rotatably supported in a bearing opening in said bracket arm 132, and its rearward end within a bearing member 134b. Bearing member 134b may be integral with casing member 134 and axially spaced therefrom to provide room for crank arm 142a secured to shaft 140. A crank arm 142 extending parallel to crank arm 142a is secured to the forward end of shaft 140. Links 130 pivoted to collars 110, as before described, have their other ends pivoted respectively to crank arms 142 and 142a. Crank arms 142 and 142a of the illustrated embodiment of the invention normally project toward the right hand side of the transmission, as indicated in Fig. 2.

Referring for convenience to directions of rotation of the rotary and angularly movable elements as they appear, viewed as in Fig. 2, when being driven forward: Input shaft rotates counter clockwise, from right to left, driving races therefore rotate clockwise, and driven races and shaft 40 rotate counter clockwise. As viewed in Fig. 1, rollers 70 rotate clockwise and rollers 70a counter clockwise. An angular movement of shaft 140 of the control means counter-clockwise (viewed as in Fig. 2) will move crank arms 142, 142a upward. This movement will rock the collars 110 counter-clockwise (Fig. 2) causing links 112 to swing the trailing carriers 80, 80a on their mooring pins in a direction to bring their free ends nearer the race axis. Although the rollers 70, 70a, are clamped between the driving and driven races each carrier 80, 80a, can swing on its mooring pin an angular extent determined by the distance between the outer face of the roller and the end of bearing bushing 106 on that side. The bearing bushings slide freely on axles 104 and, in the swinging movement of each carrier each roller is caused to incline about an axis connecting its points of contact with the raceways in a sense to steer the roller to a higher speed ratio position. That is, as will be apparent on inspection of Fig. 2, the rollers will tilt to positions in which the paths of the rollers on the driving races will be of larger diameter than before and their paths on the driven races of smaller diameter than before.

A clockwise angular movement (as viewed in Fig. 2) imparted to shaft 140 of the control mechanism will result obviously in shifting the rollers to low-speed ratio position wherein the rollers will track on the driving races in a smaller circle than before.

It is apparent that the rollers, after having been inclined as described to displace their axes from the radial planes including the race axis and roller centers would continue to spiral on the raceways if no means were provided to restore the axes of the rollers into said radial plane. Restoration of the axis of the rollers of toroidal race and roller transmission after displacement to secure ratio change has been effected hitherto by means of oblique bearing surfaces necessitating rollers, while changing ratio position, to tilt around an axis oblique to a plane normal to the race axis, as shown in U. S. Patent #1,844,464. Upon inspection of Fig. 2 of the drawings of this application it will be perceived that after inclination, say to increase the speed of output compared to input as described, carrier 80 will be held pivotally at two points, namely the center of the ball mooring 82—84, which includes the plane of rotation of the roller, and the center of the ball joint 114 and socket in pin 116, which lies at one side of the plane of rotation of the roller. While tilting to a new ratio position, carrier 80 and hence roller 70 must therefore tilt about an axis determined by these two points. Tilting about this axis will obviously result in a restoration of the roller axis into the radial plane wherein, if extended, the roller axis will intersect the race axis. By a proper selection of the location of balls 114 on control link, the rate of restoration may be made to approach constancy throughout the range of tilt. Tilt action around the inclined axis established by the mooring and link connection without the need for axial displacement of the races, is possible by provision of a normal running clearance between roller axles and bearing bushings.

Rollers 70, 70a, are limited in angular extent of tilt in both senses during forward driving by the control mechanism. In reverse driving the control mechanism acts to cause the rollers to tilt to full low speed forward position which is established by hook like stop members 119, 119a, on frames or carriers 80, 80a, engaging stop collars 18 or 18a previously referred to, so that the mechanism will be in low speed when again starting forward. This position is one that gives an even lower ratio of output to input than is established by the control in forward driving.

Figures 7, 8, 9, 10, 11:
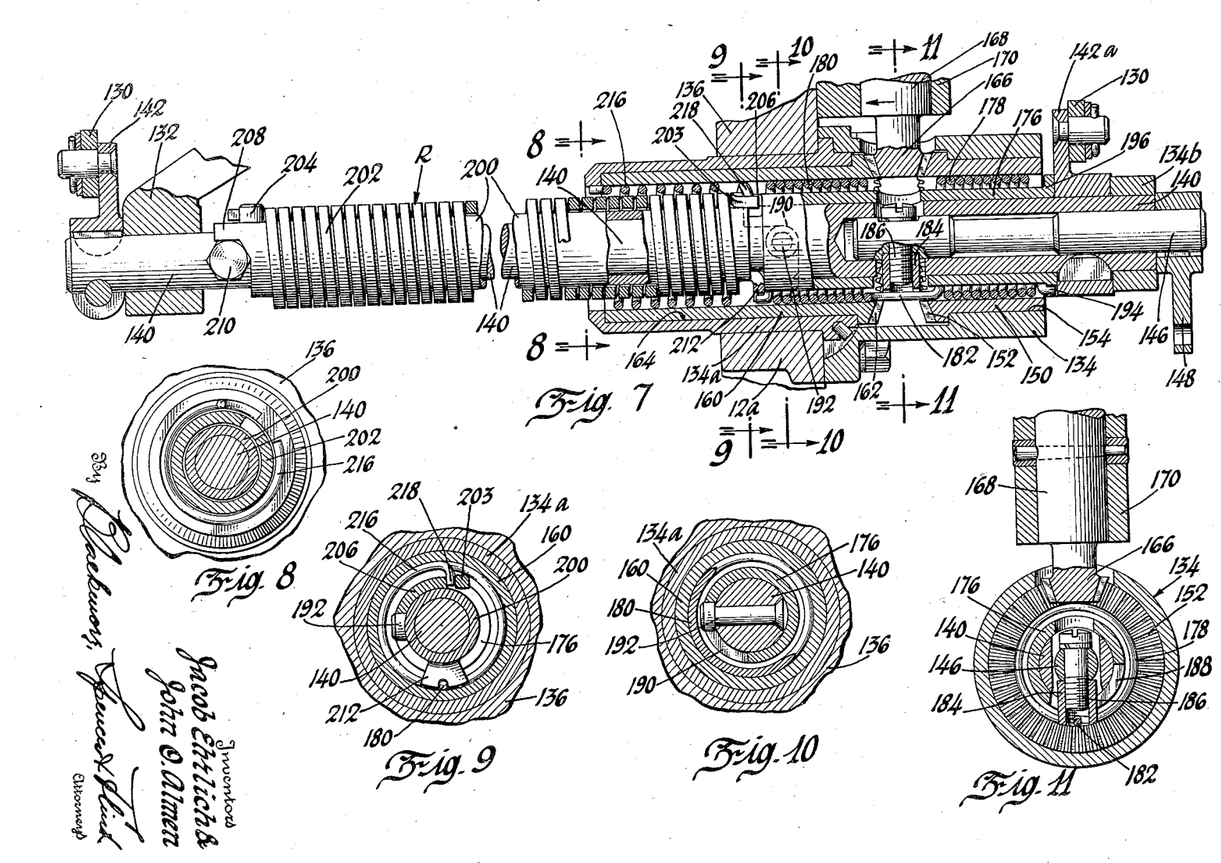
Fig. 7 is a view from above of the control mechanism shown partly in horizontal section in a way to illustrate details of combination.
Figs. 8, 9, 10 and 11 are cross sections taken in planes indicated by lines 8—8, 9—9, 10—10, and 11—11 respectively, in Fig. 7.

The control mechanism R shown in longitudinal section in Fig. 7, comprises a mechanical servo apparatus which may be excited into activity by manual or by automatic means. Numeral 146 indicates an exciter shaft occupying an axial bore in the rearward end of shaft 140, which is shown of two diameters, the part of larger diameter being at the rearward end for the purpose of receiving said exciter shaft. Exciter shaft 146 projects rearward somewhat beyond the rear extremity of shaft 140 and bearing 134b. Crank arm 148 secured to rearward projecting part of shaft 146 is designed to be connected in parallel with any suitable manual control device (not shown) and with a suitable speed responsive control device, (not shown) for the purpose of rocking shaft 146 in one sense or the opposite in order to excite or initiate the functioning of the servo-mechanism to be now described.

A rotary motor-sleeve 150 equipped with bevel gear teeth 152 at its forward end is mounted within a cylindrical bearing surface 154 formed in the interior of casing member 134. A second rotary motor-sleeve 160 axially alined with and spaced axially from sleeve 150 is rotatably mounted in a cylindical bearing surface 164 within casing member 134a. Sleeve 160 is equipped with bevel teeth 162 at its rearward end similar and opposed to teeth 152 and axially spaced therefrom to afford room for a bevel pinion 166 meshing with said teeth 152 and 162. Pinion 166 is fixed to cross shaft 168 bearing in a sleeve bracket 170 secured to rearward spider 12a (Figs. 2 and 7). Shaft 168 carries a worm pinion 172 which meshes with a worm gear 174 fixed to the rear end of input shaft section 20a. During forward driving, shaft 20—20a, rotates clockwise viewed from the front, i. e. counter clockwise as viewed in Fig. 2. Spiral gears 172 and 174 should be pitched so as to rotate pinion 166 clockwise as viewed from the right hand side of Fig. 2, thereby rotating motor-sleeve 150 counter clockwise, as viewed in Fig. 2 and from the right hand end of Fig. 7, and motor-sleeve 160 clockwise viewed from the same points. Hence, during forward driving, sleeves 150 and 160 are in continuous rotation in opposite senses as stated.

Within constantly rotating motor-sleeve 150, and surrounding an intermediate sleeve 176 rotatable on the rearward enlarged portion of shaft 140, is a coil spring clutch element 178 adapted to be expanded into frictional clutching engagement with motor-sleeve 150. A second similar coil spring clutch element 180 is disposed between motor-sleeve 160 and said intermediate sleeve 176. The two spring clutch elements 178 and 180 are connected by a straight bridge portion 182 parallel with the axis and of a length substantially equal to the distance between motor sleeves 150 and 160. This bridge portion 182 functions as the passive element of means for expanding and contracting the spring clutch elements 178 and 180. It lies in a slot in the end of a spring clutch actuating finger 184, secured by screw 186, to a flattened area on exciter shaft 146. Spring clutch actuating finger 184 extends radially through an opening in the surrounding tubular wall of shaft 140 this opening permitting angular movement with respect to shaft 140, and through a slot 188 extending circumferentially in intermediate sleeve 176. A hole is provided in the wall of the tubular part of shaft 140 to receive the head of screw 186, and a hole is provided in intermediate sleeve 176 through which the screw may be inserted and tightened by a screw driver. Sleeve 176 is also provided with a slot 190 receiving the end of a pin 192 secured in shaft 140.

The direction or sense of coiling of the spring clutch elements should be such that a counter clockwise movement (viewed from the right of Fig. 7) of actuating finger 184 thrusting the bridge portion 182 of spring clutch elements counter clockwise will permit the spring clutch element 178 to expand within motor sleeve 150 while a reverse or clockwise movement of finger 184 (viewed from right of Fig. 7) will permit clutch spring element 180 to expand inside of sleeve 160.

At its rearward end spring clutch element 178 is anchored at 194 in a notch formed in flange 196 at the rear end of intermediate sleeve 176. If, therefore, spring clutch element 178 is expanded within rotating motor sleeve 150, while the vehicle is being driven forward, intermediate sleeve 176 will be rotated with motor sleeve 150. Owing to the slots 188 and 190 in sleeve 176 receiving the finger 184 and pin 192 the intermediate sleeve 176 may rotate part of a turn independently of the shaft 140.

A sleeve 200 fitting over the portion of shaft 140 of smaller diameter is surrounded by a coiled spring 202, which is normally of larger internal diameter than the sleeve within it. The forward end of spring 202 engages a pin 204 fixed in sleeve 200. The rearward end of spring 202 is bent in an axial direction alongside of an axial tongue 206 on the front end of intermediate sleeve 176. An axial projection or shoulder 208 on the forward end of sleeve 200 bears against a stud 210 on shaft 140. Spring 202 is pretensioned to apply elastic pressure to pin 204 in a sense to cause sleeve 200 to rotate counter clockwise (as viewed from the right of Fig. 7) and press shoulder 208 against stud 210 on shaft 140.

It will now be apparent that if exciter-shaft 146 be rocked in a counter clockwise sense (viewed from the right of Fig. 7) spring clutch element 178 will expand within motor sleeve 150, which in its rotation, will rotate intermediate sleeve 176 counterclockwise; sleeve 176 engaging the rearward end of spring 202 tends to wind it up, and apply elastic pressure to sleeve 200 and therethrough to shaft 140 to rock it in a counter clockwise sense, thereby moving the arms 142, 142a counter clockwise (upward) and inclining the rollers toward a higher-speed ratio position as previously indicated.

The forward end of spring clutch element 180 is anchored to a notched lug 212 on the rearward end of said sleeve 200. If, then, exciter shaft 146 be rocked clockwise, (viewed from right of Fig. 7) spring clutch element 180 will expand within motor sleeve 160, thus rotating sleeve 200 clockwise. Shoulder 208 will then tend to move away from stud 210 on shaft 140 and pin 204 on sleeve 200 will apply tension to unwind spring 202 tending to rotate and tension it clockwise, thus through tangential pressure of the rear end of the spring exerted against axial tongue 206 intermediate sleeve 176 will be rotated clockwise, and it, through engagement with pin 192, will rotate shaft 140 clockwise thus moving crank arms 142, 142a (downward) in the direction to incline rollers 70, 70a to such an angle as to steer them on the raceways to a lower-speed ratio position, that is, to cause the rollers to track in paths of smaller diameter on the driving raceways and larger diameters on the driven raceways than before.

Since, during forward driving, motor-sleeve 150 rotates counter clockwise, and motor sleeve 160 clockwise as viewed in Fig. 2 and from right of Fig. 7 in reverse driving these sleeves rotate clockwise and counter clockwise, respectively, and slip freely on spring clutch elements 178 and 180 without any tendency to rock shaft 140. During reverse driving, therefore, spring clutch elements 178 and 180 have no effect on control.

It is desirable to have the rollers automatically assume a low speed ratio position when the transmission is in reverse. By low speed ratio position is meant that position of the rollers that gives a low output speed relative to engine speed during forward driving. Then when forward driving is resumed the transmission will be in low gear. For this purpose a reverse coil spring clutch element 216 is disposed within motor sleeve 160 and is adapted to expand within and seize said sleeve the instant it reverses. The rearward end 218 of the coil of element 216 is seated between axial projection 206 of intermediate sleeve 176 and the rearward end 203 of spring 202. The sense of coil or pitch direction of spring clutch element 216 is such that when motor sleeve 160 rotates counter clockwise (viewed from the right of Fig. 7) as it does during reverse driving, the reverse spring clutch element 216 automatically expands and seizes motor sleeve 160, but will be contracted when motor sleeve 160 rotates clockwise as it does always during forward driving of the transmission. When reverse spring clutch element 216 seizes motor sleeve 160 the clutch element rotating counter clockwise with the sleeve, causes its end 218 to press against the forward end 203 of spring 202 thus tensioning the latter and causing it to apply rotative force to shaft 140 thru pin 204, sleeve 200, shoulder 208 and stud 210, thus rocking arms 142 and 142a upward or counter clockwise, viewed from right of Fig. 7. An upward movement of arms 142 and 142a, while driving the transmission forward, causes a change toward higher-speed of output shaft relative to that of the input shaft as hitherto stated. But, while driving the transmission in reverse an upward movement of said arms 142 and 142a obviously causes rollers 70, 70a to spiral outward on races 52 and 54 causing a ratio change toward lower-speed of output shaft 40 as compared with that of the shaft 20a. In the type of transmission disclosed the races and rollers in reverse drive are rotated idly by output shaft 40. When in reverse, therefore, races 52 and 54 become the driving races as respects races 64, gears 60, 22, 174, 172, pinion 166 and motor sleeves 150 and 160. Thus an adjustment of rollers 70 that would give a high speed of shaft 40 with respect to shaft 20a while driving forward, gives a low speed of shaft 40 with respect to shaft 20a in reverse.

In forward driving, as described, the ratio position of the rollers is determined by the position of arm 148, exciter shaft 146, and clutch control finger 184. In reverse driving, these control means are ineffective, as has been pointed out. Immediately that shaft 40 begins to rotate in reverse, sleeve 160, rotating reversely, is automatically connected frictionally with shaft 140 and tends to rock arms 142 and 142a upward, as described. This tendency continues through reverse driving. Therefore, to prevent the rollers from running off the races and to stop their tilting movements, positively, in a definite low-ratio position, ready to start up in low gear on resumption of forward drive, the stop lugs 119 and 119a, are provided on the trailing carriers 80 and 80a, and the stop collars 18 and 18a locked on frame tube 116, to cooperate with the stop lugs. When the rollers 70, 70a have spiralled outward on races 52 and 54 until the stop lugs 119 and 119a have engaged the collars 18 and 18a no further tilting movement of the rollers in that sense is possible; all of them are therefore definitely held in extreme low ratio position by the stops described preventing further tilting in that sense and the frictional urge of the reverse control mechanism holding the stop lugs and stop rings in contact.

In mechanism shown, spring clutch elements 178 and 180 are right hand wound. Element 178, therefore, tends to expand within the motor sleeve 150 during the normal counter clockwise rotation (viewed from right of Fig. 7) of said sleeve during forward driving since its rearward end is anchored to sleeve 176, and element 180 likewise tends to expand within motor sleeve 160 during the normal clockwise rotation of the latter since the forward extremity is anchored to sleeve 200. The spring clutch elements are so fitted that both sleeves, however, can slip on the clutch elements during forward rotation while finger 184 remains fixed, but one or the other coil clutch element expands when the finger is moved in one sense or the other as described.

Reversing spring 216 is right hand wound and mounted so that it will not seize within motor sleeve 160 while said sleeve is rotating clockwise (viewed from right of Fig. 7) as in normal forward driving but will seize as soon as motor sleeve 160 rotates counter clockwise during reverse driving. During reverse driving, of course, the direction of rotation of sleeves 150 and 160 tends to collapse the coils of spring clutch elements 178 and 180 so that free movement of the sleeves is not interfered with by said clutch elements.

Spring 202 may be right hand wound and pre-tensioned between pin 204 on sleeve 200 and tongue 206 on sleeve 176, tending to hold sleeve 176 with the right hand end (viewed from the front) of slot 190 in contact with pin 192. As before stated spring 202 is not snugly fitted over sleeve 200 and may, therefore, yield from normal if tensioned in either sense.

We claim:

1. In friction race-and-roller transmission mechanism, a supporting member, a trailing roller carrier moored by a free universal joint to the supporting member, and a roller rotatably mounted in the carrier.

2. In friction race-and-roller transmission mechanism, a supporting member, a bifurcated roller carrier moored by a free universal joint to the supporting member, and a roller rotatably mounted between the limbs of the forked carrier.

3. In friction race-and-roller transmission mechanism, a supporting member, a trailing roller carrier moored by a universal joint to the supporting member, and a roller rotatably mounted in the carrier, with means providing limited freedom of motion of the carrier with respect to the roller in the direction of the roller axis.

4. In friction race-and-roller transmission mechanism, a supporting member, a bifurcated roller carrier moored by a universal joint to the supporting member, and a roller rotatably mounted between the limbs of the forked carrier, with means providing freedom of motion of the carrier with respect to the roller in the direction of the roller axis.

5. In friction race-and-roller transmission mechanism, a supporting member, a bifurcated roller carrier moored by a universal joint to the supporting member, a roller journaled between the limbs of the forked carrier at their free ends, with means providing freedom of movement of the carrier with respect to the roller along the roller axis, and a stop on each limb of the carrier for limiting said freedom of movement.

6. In friction race-and-roller transmission mechanism, a supporting member, a bifurcated roller carrier moored by a universal joint to the supporting member, a roller having a fixed arbor journaled between the limbs of the forked carrier at their free ends, said limbs having bearing seats provided with side gaps to admit the roller arbor, and bushings in said bearing seats sleeved over the arbor, the inner ends of said bushings being spaced from the roller to permit limited movement of the carrier with respect to the roller in the direction of the axis of the latter.

7. In friction race-and-roller transmission mechanism, coaxial races having toroidal raceways, a supporting member, trailing roller carriers each moored by a universal joint to the supporting member, a roller rotatably mounted in each carrier in tractive engagement with the raceways, with means providing limited freedom of motion of the carrier with respect to the roller in the direction of the roller axis, a control means, and connections from the control means to the carriers constructed and arranged to move the free ends of the carriers in the direction of the roller axes.

8. A combination as defined in claim 7, in which the connections from the control means to the carriers comprise a collar angularly movable about the race axis, means for rocking the collar from the control means, and links connecting the collar to the several carriers.

9. In friction race and roller transmission mechanism, coaxial races having toroidal raceways, a supporting member, trailing roller carriers each moored by a universal joint to the supporting member, a roller rotatably mounted in each carrier in tractive engagement with the raceways, with means providing limited freedom of motion of the carrier with respect to the roller in the direction of the roller axis, a control means, connections between the control means and the carriers constructed and arranged to move the free ends of the carriers in the direction of the roller axes to equal extents in response to a given movement of the control means, and adjusting means between the several carriers and control means constructed and arranged to change the relation between a carrier and the control means in order that the several rollers of a set may be brought into precisely similar positions with respect to their paths of movement on the raceways.

10. A combination as defined in claim 9 in which the connection between the control means and the carriers comprises a collar, angularly movable about the race axis, means to rock the collar from the control means, a plurality of links connecting the collar with the several carriers and an adjustable connection between said links and carriers, adapted to shorten or lengthen the distance between the points of pivotal connection of a link to the collar and carrier.

11. A combination as defined in claim 9 in which the connections between the control means and the carriers comprise a plurality of links severally connected to the carriers, means for imparting equal amplitudes of movement to the several links, ball and socket connections between each link and carrier, and means for eccentrically adjusting one element of the ball and socket connection.

12. A combination as defined in claim 9 in which the connections between the control means and the carriers comprises a collar angularly movable about the race axis, means to rock the collar from the control means, a plurality of links connecting the collar with the several carriers, each link having the end adjacent the carriers turned at right angles to the body of the link and having a ball end, a pin rotatable in each carrier said pin having a socket adapted to receive the ball end of the link, said socket being disposed eccentrically with respect to the axis of the pin, and means whereby the pin may be rotated and locked in any adjusted position.

13. In friction race-and-roller transmission mechanism, coaxial races having toroidal raceways, a power output shaft, coaxial with the races and driven thereby, a supporting member, trailing roller carriers each moored by a universal joint to the supporting member, a roller rotatably mounted in each carrier in tractive engagement with the raceways, with means providing limited freedom of motion of the carrier with respect to the roller in the direction of the roller axis, the plane of rotation of said roller intersecting the mooring joint of the carrier; a control means, and connections from the control means to the carriers constructed and arranged to move the free ends of the carriers in the direction of the roller axis, said connections comprising links having universal pivotal connections with the several carriers at points removed from the plane of rotation of the rollers.

14. In a friction race-and-roller transmission mechanism, supporting means, a roller carrier, a roller rotatably mounted in the carrier, means for mooring the carrier to the supporting means by a ball and socket joint the center of which lies substantially in the central plane of rotation of the roller, and a second universal pivotal connection for the carrier at a point outside the plane of rotation of the roller, said two universal pivotal connections determining the axis of tilt of the roller.

15. In friction race-and-roller transmission mechanism, coaxial races having toroidal raceways, an output shaft coaxial with the races, an input shaft for driving one of the races, the other race being fixed to the output shaft, a supporting member, roller carriers moored by a universal joint to the supporting member, a roller rotatably mounted in each carrier, means for disconnecting the input shaft from the driving race and for connecting it directly with the output shaft for reverse driving, a control means, connections between the control means and the roller carriers for regulating the ratio position of the rollers during forward drive, automatic means for adjusting the rollers into low-speed position when in reverse and stops on the carriers and on the supporting means for limiting the tilting of the rollers to low speed position during reverse drivng.

16. In friction transmission mechanism, a supporting frame, coaxial races and interposed rollers capable of tilting to vary the transmission ratio, carriers for the rollers, an input shaft for driving one of the races, an output shaft adapted to be rotated by the driven race, means for disconnecting the input shaft from the driving race, reverse gearing between the input and output shaft by-passing the friction elements, means for controlling the ratio position of the rollers during forward driving, automatic means for tilting the rollers to low speed position in reverse driving, and cooperating stops on roller carriers and frame to position the rollers in low speed position during reverse driving.

17. In friction race-and-roller transmission mechanism, a supporting member, a trailing roller carrier moored by a free universal joint to the supporting member, and a roller mounted in the carrier, the center of said universal joint lying substantially in the center plane of rotation of the roller.

18. In friction race-and-roller transmission mechanism, a supporting member, a roller carrier mounted at one end only of the supporting member by a free universal joint, and a roller rotatably mounted in the carrier.

19. In friction race-and-roller transmission mechanism, a supporting member, a bifurcated roller carrier comprising two limbs united at one end to form a base and having their other ends spaced apart and free of one another, a free universal joint connecting the carrier at its base to the supporting member and a roller rotatably mounted between the limbs of the carrier.

JACOB EHRLICH.
JOHN O. ALMEN.